US006944459B2

(12) United States Patent
Parantainen et al.

(10) Patent No.: US 6,944,459 B2
(45) Date of Patent: Sep. 13, 2005

(54) METHOD AND ARRANGEMENT FOR TRANSFERRING INFORMATION IN A PACKET RADIO SERVICE

(75) Inventors: Janne Parantainen, Helsinki (FI); Mika Forssell, Espoo (FI)

(73) Assignee: Nokia Mobile Phones Ltd., Espoo (FI)

( * ) Notice: Subject to any disclaimer, the term of this patent is extended or adjusted under 35 U.S.C. 154(b) by 742 days.

(21) Appl. No.: 09/934,553

(22) Filed: Aug. 22, 2001

(65) Prior Publication Data

US 2002/0045458 A1 Apr. 18, 2002

(30) Foreign Application Priority Data

Aug. 25, 2000 (FI) .............................................. 20001876

(51) Int. Cl.[7] ................................................. H04Q 7/20
(52) U.S. Cl. ................................ 455/452.1; 455/452.2; 455/455; 455/430
(58) Field of Search ...................................... 455/452.1

(56) References Cited

U.S. PATENT DOCUMENTS 5,995,496 A * 11/1999 Honkasalo et al. ......... 370/318
6,529,525 B1 * 3/2003 Pecen et al. ................ 370/469
6,671,511 B1 * 12/2003 Forssell et al. .......... 455/452.1

FOREIGN PATENT DOCUMENTS

| EP | 0872982 A1 | 10/1998 |
| EP | 1006695 A1 | 6/2000 |
| EP | 1021017 A2 | 7/2000 |
| EP | 1139613 A1 | 10/2001 |
| FI | 103454 B | 6/1999 |

OTHER PUBLICATIONS

ETSI EN 301 349 V6.6.1 2000; "Digital Cellular Telecommunications system (Phase 2+); General Packet Radio Service (GPRS); Mobile Station (MS)—Base Station System (BSS) Interface; Radio Link Control/Medium Access Control (RLC/MAC) Protocol", GSM 04.60 version 6.6.1, 1997, relevant pages thereof.

"Digital Cellular Telecommunications System (Phase 2+); General Packet Radio Service (GPRS); Mobile Station (MS)—Base Station System (BSS) Interface; Radio Link Control/Medium Access Control (RLC/MAC) Protocol", GSM 04.60, V.7.2.1, 1998.

* cited by examiner

Primary Examiner—Creighton Smith
(74) Attorney, Agent, or Firm—Perman & Green, LLP.

(57) ABSTRACT

The invention relates generally to a method and an arrangement for transferring information in a packet radio service. Especially the invention applies to transferring delay sensitive data, such as speech and video data, in a mobile cellular telecommunications system. It is an object of this invention to provide a solution, in which the physical connection of a packet radio service is kept reserved also during the passive periods of a session but the same physical resource can still be shared between multiple users. In the present solution after the end of an active period of data transmission a predetermined time period is waited until the connection is released. The length of the time period is informed to the mobile station by the network on a dedicated or on a broadcast channel. The length of the time period is preferably made dependent on the required quality of service value of the connection and on the momentary communication activity in the network or cell.

24 Claims, 6 Drawing Sheets

METHOD AND ARRANGEMENT FOR TRANSFERRING INFORMATION IN A PACKET RADIO SERVICE

TECHNICAL FIELD OF THE INVENTION

The invention relates generally to a method and an arrangement for transferring information in a packet radio service. Especially the invention applies to transferring delay sensitive data, such as speech and video data, in a mobile telecommunications system.

BACKGROUND ART OF THE INVENTION

The denomination "mobile telecommunications system" refers generally to any telecommunications system which enables a wireless communication connection between a mobile station (MS) and the fixed parts of the system when the user of the mobile station is moving within the service area of the system. A typical mobile communications system is a Public Land Mobile Network (PLMN). The majority of mobile telecommunications systems in use at the time of the filing of this patent application belong to the second generation of such systems, a well-known example being the GSM system (Global System for Mobile telecommunications). However, the invention also applies to the next or third generation of mobile telecommunications systems, such as a system known as the UMTS (Universal Mobile Telecommunications System) which undergoes standardisation.

Internet real time services have gained popularity during the past few years. IP (Internet Protocol) telephony and different streaming applications are already common in the Internet. Also the demand for wireless access to these real time services is expected to be still growing. Packet switched wireless networks, such as GPRS (General Packet Radio Service), are designed to provide data services, e.g. Internet services, cost effectively. In GPRS the channels are not dedicated for one user continuously but are shared between multiple users. This facilitates efficient data multiplexing. However, GPRS is not originally designed for transferring delay sensitive real time data, e.g. IP telephony sessions. For this reason, GPRS contains various technical solutions that do not meet the requirements set by real time traffic. In the following text, a denomination "delay sensitive data" is used for data flows that should be transferred on real time basis and that may have passive periods during which the data flow is suspended.

In order to better understand the problems of the prior art solutions and the idea of the present invention, the structure of a new generation digital cellular radio system is first shortly described, and GPRS is then described in more detail.

Figure 1A:
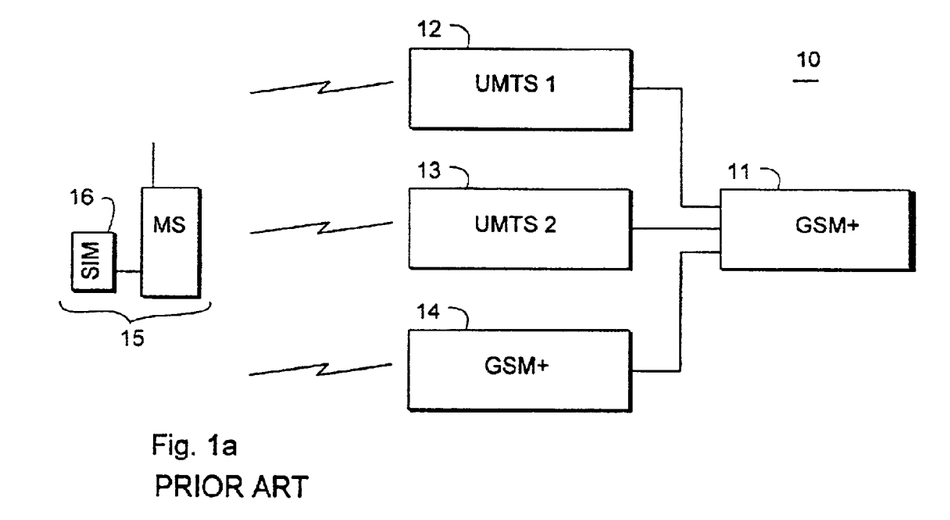
FIG. 1a illustrates a prior art cellular communications system.

FIG. 1a shows a version of a future cellular radio system which is not entirely new compared to the known GSM system but which includes both known elements and completely new elements. The terminals are connected to the radio access network RAN which includes the base stations and the base station controllers. The core network of a cellular radio system comprises mobile services switching centres (MSC), other network elements (in GSM, e.g. SGSN and GGSN, i.e. Serving GPRS Support Node and Gateway GPRS Support node, where GPRS stands for General Packet Radio Service) and related transmission systems. According, e.g. to the GSM+ specifications developed from GSM, the core network can also provide new services.

In FIG. 1a, the core network of a cellular radio system 10 comprises a GSM+ core network 11 which has three parallel radio access networks linked to it. Of those, networks 12 and 13 are UMTS radio access networks and network 14 is a GSM+ radio access network. The upper UMTS radio access network 12 is, e.g. a commercial radio access network, owned by a telecommunications operator offering mobile services, which equally serves all subscribers of said telecommunications operator. The lower UMTS radio access network 13 is, e.g. private and owned e.g. by a company in whose premises said radio access network operates. Typically the cells of the private radio access network 13 are nano- and/or picocells in which only terminals of the employees of said company can operate. All three radio access networks may have cells of different sizes offering different types of services. Additionally, cells of all three radio access networks 12, 13 and 14 may overlap either entirely or in part. The bit rate used at a given moment of time depends, among other things, on the radio path conditions, characteristics of the services used, regional overall capacity of the cellular system and the capacity needs of other users. The new types of radio access networks mentioned above are called generic radio access networks (GRAN). Such a network can co-operate with different types of fixed core networks CN and especially with the GPRS network of the GSM system. The generic radio access network (GRAN) can be defined as a set of base stations (BS) and radio network controllers (RNC) that are capable of communicating with each other using signaling messages.

Figure 1B:
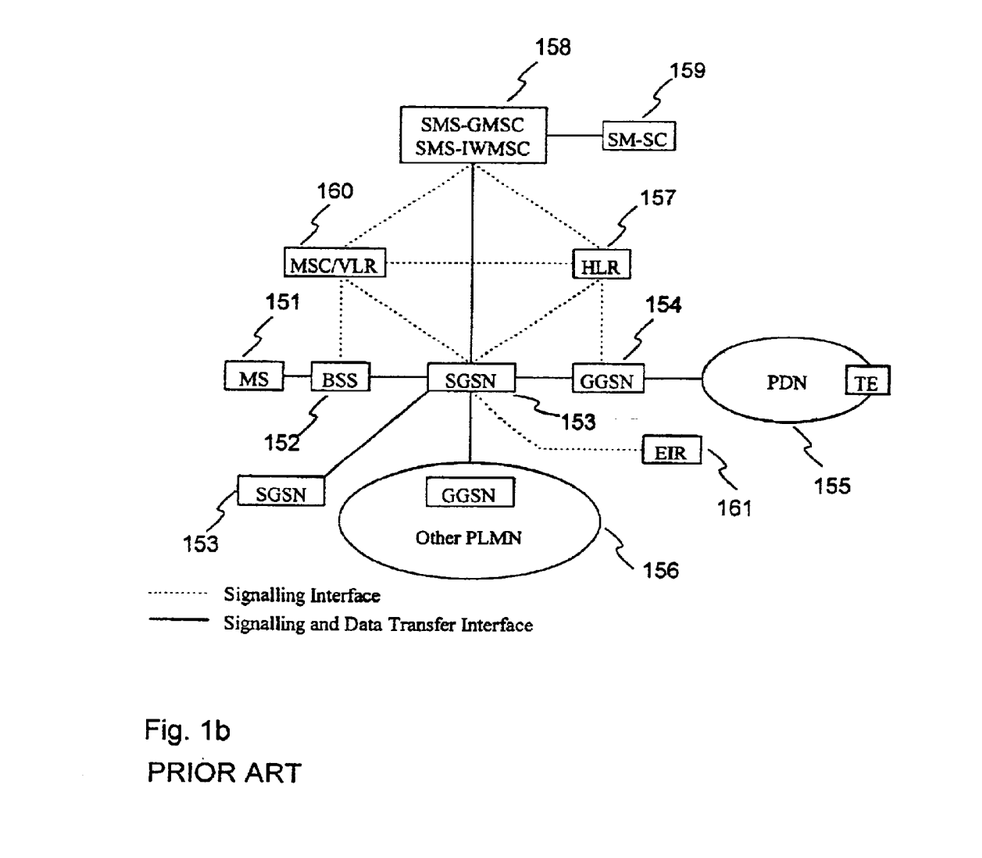
FIG. 1b illustrates an architecture of general packet radio service (GPRS)

FIG. 1b shows an architecture of a general packet radio service (GPRS). The GPRS is a new service that is currently based on the GSM system but it is supposed to be generic in the future. GPRS is one of the objects of the standardisation work of the GSM phase 2+ and UMTS at the ETSI (European Telecommunications Standards Institute). The GPRS operational environment comprises one or more subnetwork service areas, which are interconnected by a GPRS backbone network. A subnetwork comprises a number of packet data service nodes (SN), which in this application will be referred to as serving GPRS support nodes (SGSN) 153, each of which is connected to the mobile telecommunications system (typically to a base station through an interworking unit) in such a way that it can provide a packet service for mobile data terminals 151 via several base stations 152, i.e. cells. The intermediate mobile communication network provides packet-switched data transmission between a support node and mobile data terminals 151. Different subnetworks are in turn connected to an external data network, e.g. to a Public Data Network (PDN) 155, via GPRS gateway support nodes GGSN 154. The GPRS service thus allows the provision of packet data transmission between mobile data terminals and external data networks when the appropriate parts of a mobile telecommunications system function as an access network.

In order to access the GPRS services, a mobile station shall first make its presence known to the network by performing a GPRS attachment. This operation establishes a logical link between the mobile station and the SGSN, and makes the mobile station available for SMS (Short Message Services) 158, 159, over GPRS, paging via SGSN, and notification of incoming GPRS data. More particularly, when the mobile station attaches to the GPRS network, i.e. in a GPRS attachment procedure, the SGSN creates a mobility management context (MM context). Also the authentication of the user is carried out by the SGSN in the GPRS attachment procedure. In order to send and receive GPRS data, the MS shall activate the packet data address wanted to be used, by requesting a PDP activation procedure (Packet Data Protocol). This operation makes the mobile station known in the corresponding GGSN, and interworking with external data networks can commence. More particularly, a PDP context is created in the mobile station and the GGSN and the SGSN. The packet data protocol context defines different data transmission parameters, such as the PDP type (e.g. X.25 or IP), the PDP address (e.g. X.121 address), the quality of service (QoS) and the NSAPI (Network Service Access Point Identifier). The MS activates the PDP context with a specific message, Activate PDP Context Request, in which it gives information on the TLLI, the PDP type, the PDP address, the required QoS and the NSAPI, and optionally the access point name (APN).

FIG. 1 also shows the following GSM functional blocks: Mobile Switching Center (MSC)/Visitor Location Register (VLR) 160, Home Location Register (HLR) 157 and Equipment Identity Register (EIR) 161. The GPRS system is usually also connected to other Public Land Mobile Networks (PLMN) 156.

Functions applying digital data transmission protocols are usually described as a stack according to the OSI (Open Systems Interface) model, where the tasks of the various layers of the stack, as well as data transmission between the layers, are exactly defined. In the GSM system phase 2+, which in this patent application is observed as an example of a digital wireless data transmission system, there are five operational layers defined.

Figure 2:
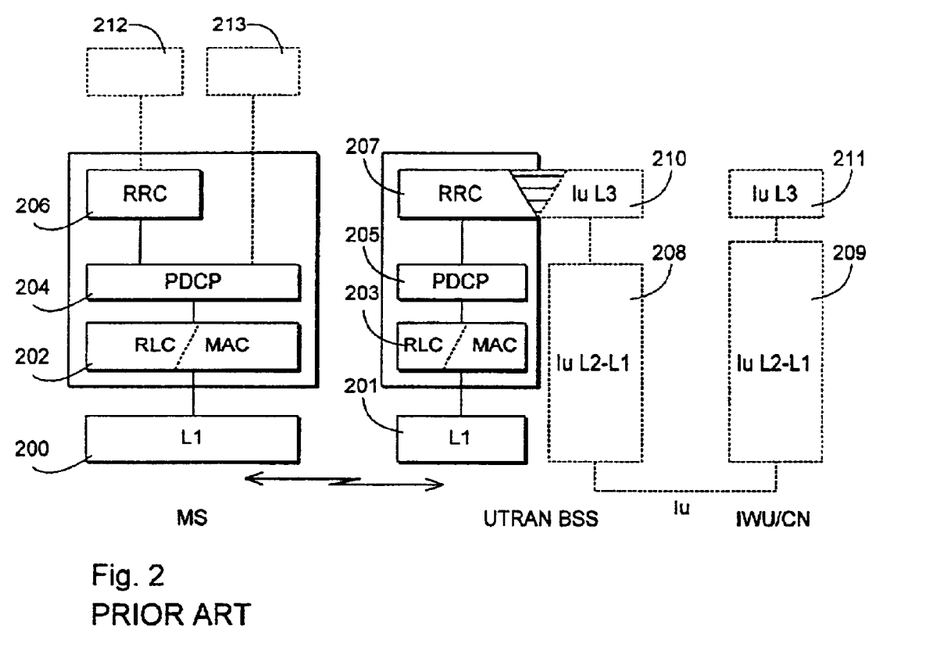
FIG. 2 illustrates protocol levels of a prior art cellular communications system.

Relations between the protocol layers are illustrated in FIG. 2. The lowest protocol layer between the mobile station MS and the base station subsystem is the layer 1 (L1) 200, 201, which corresponds to a physical radio connection. Above it, there is located an entity corresponding to the layers 2 and 3 of a regular OSI model, wherein the lowest layer is a radio link control/media access control (RLC/MAC) layer 202, 203; on top of it a PDCP (or LLC) layer 204, 205; and topmost a radio resource control (RRC) layer 206, 207. Between the base station subsystem UTRA BSS of the generic radio access network and an interworking unit/core network IWU/CN located in the core network, there is assumed to be applied a so-called Iu interface, where the layers corresponding to the above described layers from L1 to PDCP are the layers L1 and L2 of the OSI model (blocks 208 and 209 in the drawing), and the layer corresponding to the above described RRC layer is the layer L3 of the OSI model (blocks 210 and 211 in the drawing).

The mobile station MS must include a higher-level control protocol 212 and a protocol 213 for serving higher-level applications, of which the former communicates with the RRC layer 206 in order to realise control functions connected to data transmission connections, and the latter communicates directly with the PDCP layer 204 in order to transmit such data that directly serves the user (for instance digitally encoded speech). In a mobile station of the GSM system, the blocks 212 and 213 are included in the above mentioned MM layer.

In GPRS, a Temporary Block Flow (TBF) is created for transferring data packets on a packet data channel. The TBF is a physical connection used by the two Radio Resource (RR) peer entities to support the unidirectional transfer of higher layer (e.g. LLC or PDCP) Packet Data Units (PDU) on packet data physical channels. The TBF is normally always released when there is no data to be transmitted. This is a problem in voice services because there are silent periods in between active periods. During these silent or "passive" periods no data is transferred and the TBF is thus released. The TBF setup procedure is likely to be too long in order to be set up fast enough when the active period continues.

An example of the resource allocation in the GPRS of the current GSM Phase 2+ specification is next described in more detail.

In the GSM Phase 2+ the uplink resource allocation is currently specified as follows. The Mobile Station (MS) requests uplink radio resources by sending a PACKET CHANNEL REQUEST message to the network. Various access type values are specified for the request message. For data transfer 'one phase access', 'two phase access' and 'short access' access type values are defined. Using 'short access' access type value, the MS may request the radio resources to transfer only few RLC data blocks, and therefore it is not applicable for transferring continuous data flows.

When a network receives a PACKET CHANNEL REQUEST message indicating one phase access, it may allocate radio resources on one or several Packet Data Channels (PDCH). The allocation is based on information included in the request message. The following table shows an example for an 11 bit message content of a PACKET CHANNEL REQUEST message:

| bits | | | | | | | | | | | Packet Channel Access |
|---|---|---|---|---|---|---|---|---|---|---|---|
| 11 | 10 | 9 | 8 | 7 | 6 | 5 | 4 | 3 | 2 | 1 | |
| 0 | m | m | m | m | m | p | p | r | r | r | One Phase Access Request |
| 1 | 0 | 0 | n | n | n | p | p | r | r | r | Short Access Request |
| 1 | 1 | 0 | 0 | 0 | 0 | p | p | r | r | r | Two Phase Access Request |
| 1 | 1 | 0 | 0 | 0 | 1 | r | r | r | r | r | Page Response |
| 1 | 1 | 0 | 0 | 1 | 0 | r | r | r | r | r | Cell Update |
| 1 | 1 | 0 | 0 | 1 | 1 | r | r | r | r | r | Mobility Management procedure |
| 1 | 1 | 0 | 1 | 0 | 0 | r | r | r | r | r | Measurement Report |
| All others | | | | | | | | | | | Reserved |

An 11 bit PACKET CHANNEL REQUEST message indicating one phase access has a field of 5 bits describing the multislot class of the mobile station, a field of two bits indicating requested priority and a field of three bits describing random reference (random mobile station identification information).

The following table shows an example for an 8 bit message content of a PACKET CHANNEL REQUEST message:

| bits | | | | | | | | Packet Channel Access |
|---|---|---|---|---|---|---|---|---|
| 8 | 7 | 6 | 5 | 4 | 3 | 2 | 1 | |
| 1 | m | m | m | m | m | r | r | One Phase Access Request |
| 0 | 0 | n | n | n | r | r | r | Short Access Request |
| 0 | 1 | 0 | 0 | 0 | r | r | r | Two Phase Access Request |
| 0 | 1 | 0 | 0 | 1 | r | r | r | Page Response |
| 0 | 1 | 0 | 1 | 0 | r | r | r | Cell Update |
| 0 | 1 | 0 | 1 | 1 | r | r | r | Mobility Management procedure |
| 0 | 1 | 1 | 0 | 0 | r | r | r | Measurement Report |
| All others | | | | | | | | Reserved |

An 8 bit Packet Channel Request message indicating one phase access has a field of 5 bits describing the multislot class of the mobile station and a field of two bits describing random reference. The information about the allocated radio resources is sent to the Mobile Station with a PACKET UPLINK ASSIGNMENT message.

When a network receives a PACKET CHANNEL REQUEST message indicating two phase access, it may allocate limited radio resources on one packet data channel. The allocated radio resources are transmitted to the mobile station with a PACKET UPLINK ASSIGNMENT message. After this the mobile station transmits a PACKET RESOURCE REQUEST message to the network by using the allocated radio resources. The message defines more accurately the required radio resources, e.g. requested bandwidth and priority, and the radio capability of the mobile station. Based on the information received in the PACKET RESOURCE REQUEST message, the network may assign one or several packet data channels to the TBF and informs the assigned radio resources to the mobile station with a PACKET UPLINK ASSIGNMENT message.

Above, the request of resources was made using the GPRS control channel as an example. There are also other ways of requesting resources in case the cell does not include a GPRS control channel (even if it supports GPRS). In this case the resource request can be made using a GSM control channel.

In the prior art uplink radio resource allocation the following problems may arise:

If the priority field included into the PACKET CHANNEL REQUEST and the PACKET RESOURCE REQUEST messages does not unambiguously define delay sensitive real time traffic, the network might not be able to provide the needed radio resources for the MS. Thus, e.g. transferring speech using the GPRS might not reach a sufficient quality.

The default RLC mode is an acknowledged mode in one phase access. Since real time traffic would be transferred using unacknowledged RLC mode, two phase access should be used. Using two phase access, additional radio resource request information may be given to the network. However, two phase access causes additional delay to channel assignment procedure, because the mobile station has to send two request messages to the network instead of one. In spite of the additional radio resource request information it is not guaranteed that the network is able to provide the needed radio resources for the mobile station transferring delay sensitive real time traffic.

When allocating radio resources for uplink transfer, downlink radio resources cannot be allocated simultaneously, because the downlink temporary block flow cannot be created without downlink packets. Thus it is possible that, when the mobile station then would receive a downlink packet, the network is unable to assign radio resources for the transfer of the packet.

Downlink radio resource allocation is currently specified as follows: When the network receives data for a mobile station which has no assigned radio resources and whose cell location is known, the network assigns radio resources on one or several packet data channels by transmitting a PACKET DOWNLINK ASSIGNMENT message to the mobile station. When the mobile station receives the assignment message, it starts listening allocated packet data channels for Radio Link Control (RLC) data blocks.

In downlink radio resource allocation, the following problems may arise:

If information attached to data (coming from the SGSN) does not unambiguously define delay sensitive real time traffic, the network may not be able to provide the needed downlink radio resources for the MS.

Also if there is need to transfer delay sensitive real time traffic to both directions, downlink and uplink, the mobile station may request uplink radio resources only when the network assigns sending permission to the mobile station. This may cause a delay of variable amount of time, such as several seconds.

When allocating radio resources for downlink transfer, uplink radio resources cannot be allocated simultaneously because the uplink temporary block flow cannot be created without uplink packets. Thus it is possible, that the mobile station requests uplink radio resources but the network is unable to assign the requested radio resources.

Uplink radio resource deallocation is currently specified as follows: Every uplink RLC data block includes a countdown value (CV) field. It is specified in [1] that the CV shall be 15 when the mobile station has more than BS_CV_MAX (broadcast parameter) RLC data blocks left to be transmitted to the network. Otherwise the mobile station indicates to the network the number of remaining RLC data blocks with the CV field. The last RLC data block shall be sent to the network with the CV value set to '0'. Specification [1] defines also that once the mobile station has sent a CV value other than '15', it shall not enqueue any new RLC data blocks meaning that the new RLC data blocks shall not be sent during the ongoing TBF. Once the network receives RLC data block with the CV field set to '0', the TBF release procedures are initiated.

In uplink radio resource deallocation, the following problems may arise:

If delay sensitive real time data is transferred over radio interface according to current GPRS rules, the mobile station will have to establish several TBFs per session, because during the passive periods the mobile station has no RLC data blocks to send to the network and thus the CV value '0' terminates the uplink TBF. Because the TBF setup procedure takes time, delay sensitive traffic cannot be transmitted with good quality. Also, there are no guarantees that free radio resources are always available when the mobile station requests uplink radio resources.

Downlink radio resource deallocation is currently specified as follows: Every downlink RLC data block includes a Final Block Indicator (FBI) field in the RLC header. The specification [1] defines that the network indicates to the mobile station the release of the downlink TBF by setting the FBI field to '1'. The network sets the FBI field to '1' when it has no more RLC data blocks to send to the mobile station. After receiving RLC data block with FBI field set to '1' the mobile station shall acknowledge to the network that it has received the FBI information. When the network receives the acknowledgement message, the TBF is released.

In downlink radio resource deallocation, the following problems may arise:

If delay sensitive real time traffic is transferred over radio interface according to current GPRS rules, the network would have to establish several TBFs per session, because during the passive periods the network has no RLC data blocks to send to the mobile station and thus the FBI value '1' terminates the downlink TBF. Also, there are no guarantees that free radio resources are always available when the network tries to allocate downlink radio resources.

Problems also occur in assigning uplink and downlink sending permissions:

If delay sensitive real time data traffic is transferred on packet data channel/channels (PDCH), it is not guaranteed that adequate sending permissions are given in order to transfer the data, because the current network may not have unambiguous knowledge about delay sensitive data being transferred.

A further problem with the prior art specification is related to the feature that the network assigns transmission permissions for uplink and downlink directions independently, i.e. controls which mobile station receives data next and which mobile station may send data next. However, delay sensitive data, such as speech, has strict delay requirements. Consequently, whenever a delay sensitive data user has something to transmit, it must be able to do so in order to maintain an acceptable service level. If more than one users are allocated to the same packet data channel it is probable that at some point two or more users need to transmit simultaneously, and just one can be served on the channel. In speech conversations a large proportion of the connection time is silence. Thus it would be possible to statistically multiplex more than one speech user for one packet data channel. The prior art GPRS channel reservation system, however, is not elaborate enough to support this need. Therefore only one user of delay sensitive data transfer can be allocated for one packet data channel, which means that the use of the channel capacity is not optimised.

When the network notices that a mobile station wants to send delay sensitive data in the uplink direction the network reserves as much uplink resources to the mobile station as is requested. This naturally requires that the network has the required resources available. This may mean that the packet data channel is dedicated temporarily for a single mobile station in the uplink direction. During passive periods in uplink delay sensitive data transfer the network may assign uplink sending permissions of the allocated channels for other mobile stations. Since the mobile station transferring delay sensitive data reserves the uplink capacity of the packet data channel, other mobile stations that are allocated to the same packet data channel can not be assigned a sending permission to find out, whether they have data to send in the uplink direction. Also, if more than one mobile station allocated to the same packet data channel would need to send delay sensitive data at the same time, only one could be served. Therefore the network is forced to restrict the number of mobile stations transferring delay sensitive data according to the number of packet data channels in order to provide acceptable service quality.

As discussed above, in the present (E)GPRS (E=Enhanced) standards the MAC layer temporary block flows TBF are released after countdown procedure. This means that whenever the buffer is empty TBF is released. This means that the number of required TBF allocations, deallocations and reallocations during one user session can be high. This means that the effect of the problems discussed above may become severe.

Document [2] shows a solution for reducing the disadvantages of the prior art. This solution is based on a method to keep the TBF on also during idle periods when the transmission buffer is empty if the last RLC block has not been transmitted. The TBF is released only if a "release TBF" signaling message is received or if the idle (inactive) period lasts over a determined threshold period. This way many of the unnecessary TBF setups can be avoided and system efficiency can be improved.

However, with this solution the disadvantages can not be completely overcome. The "threshold period" can not be very long, because this would cause the use of the communication capacity to be inefficient, especially in situations of high communication loads. When TBF is on many network resources, such as temporary flow identifier (TFI), memory, etc., are reserved for the connection. Network needs also to allocate physical resources (eg. polling) for the MSs having TBFs for allowing them to transfer data. For this reason, TBFs should not be kept on unnecessarily long time periods.

But in case of applications which send small packets and wait for answers/acknowledgements to those packets, the TBFs will become released during the waiting period. For example all TCP based applications, such as Internet web browsing, begin the message exchange with three-way handshake where the following message is a response to the previous message. In such cases TBF is setup and released separately for each packet. Since TBF setup procedure loads control channels and is slow this procedure results in high signaling load, slow data transfer and low throughput.

SUMMARY OF THE INVENTION

It is thus an object of this invention to provide a method and an arrangement that offers solutions to the prior art problems. Especially, it is an object of this invention to provide a solution, in which the quality of service is optimal in varying applications, requirements and communication loads, yet the same physical resource can still be efficiently shared between multiple users.

The objects of the invention are fulfilled by providing a procedure, in which the physical connection of a packet radio service, ie. a TBF may be kept functional also when there is a passive transfer period between the mobile station and the network. The procedure supports delay sensitive traffic while utilizing radio resources efficiently.

One idea of the present invention is that after the end of an active period of data transmission a predetermined time period is waited until the connection is released, and the length of the predetermined time period is controllable. With different timer values it is possible to control how long the TBF is kept on during idle periods before the TBF is released. The length of the time period is preferably determined in the network, and the length of the time period can be informed to the mobile station by the network on a dedicated or on a broadcast channel.

The length of the time period is preferably made dependent on the required quality of service parameters and traffic type of the connection, and on the momentary communication activity in the network or cell. This way a good quality of service can be achieved even in applications which require longer periods between successive active periods, and still efficient use of communication capacity can be achieved.

The controllability of the time period value is very advantageous, because while the lengths of inactive periods depend on the application (TCP applications e.g. mail vs. voice), the value which may be appropriate for web browsing may not be adequate for chat or voice connections. It is thus also preferable that the network is well informed on traffic type, eg. whether the data to be transferred is delay sensitive. This information can be given to the network for example in a priority field included in a Quality of Service profile information element.

In order to minimize the amount of data that must be transferred over the radio it is preferable to create a number defined timer values. These values can be related to a certain bitmap so that certain bit combination unambiguously defines a certain timer value.

Timer values can be communicated to the mobile station in, for example, system information messages which are broadcast messages sent through BCCH (Broadcast Control CHannel) or PBCCH (Packet Broadcast Control Channel). Another way to the inform the timer value is to use a signaling message that is dedicated to only a certain mobile station or group of mobile stations. A preferable message to be used would be a message that is used to allocate resources for the mobile station, such as a Packet Assignment Message.

A mobile station may also give an initial timer value for the network as a suggestion, which may be used by the network when determining the value.

The present inventive idea can be used in uplink or downlink data transfer. The timer values may be same or different in the two data transfer directions.

The present invention offers important advantages over prior art methods. With the present invention it is possible to use the packet channel resources very efficiently and to offer an optimal quality of service in any application or traffic condition.

It is characteristic to a method according to the invention for transferring a data flow by creating a connection on a packet radio service of a telecommunication system, said connection constituting a packet data channel, wherein the data flow comprises at least one active data transfer period, and after an active data transfer period the connection is maintained for a predetermined time period, whereafter the connection is released unless a new active period starts before the predetermined time period has lapsed, that the the length of said predetermined time period is determined by the telecommunication system, and information on said determined value is transferred from the telecommunication system to a mobile station.

The invention also applies to a telecommunication system for transferring a data flow by creating a connection on a packet radio service, wherein the data flow comprises at least one active data transfer period, and the telecommunication system comprises means for maintaining the connection for a predetermined time after an active data transfer period and means for releasing the connection after the predetermined time period has passed unless a new active period has started, having the characteristic means for determining the length of said predetermined time period, and means for transferring information on said determined value from the telecommunication system to a mobile station.

The invention also applies to a mobile station for transferring a data flow by creating a connection on a packet radio service to a cellular telecommunication system, wherein the data flow comprises at least one active data transfer period, and the mobile station comprises means for maintaining the connection for a predetermined time after an active data transfer period and means for releasing the connection after the predetermined time period has passed unless a new active period has started, having the characteristic means for receiving information on length of said predetermined time period from the telecommunication system.

Preferred embodiments of the invention are been presented in dependent claims.

BRIEF DESCRIPTION OF THE DRAWINGS

In the following the invention is described in more detail by means of the attached drawings in which.

DETAILED DESCRIPTION

FIGS. 1 and 2 were described above in the prior art description. In the following, first principles of indicating and of allocating resources for delay sensitive data is described using an embodiment in a GPRS system as an example.

Figure 3:
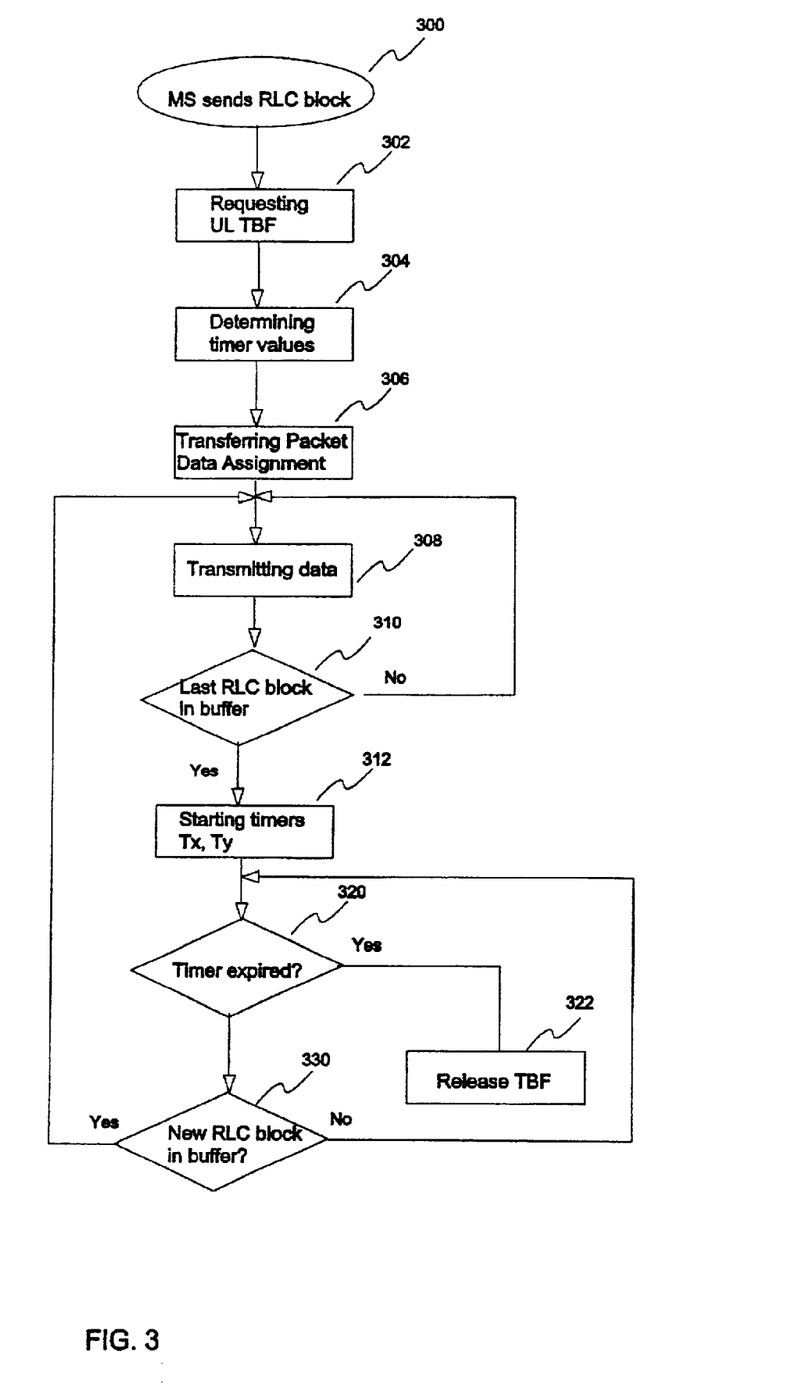
FIG. 3 illustrates a flow diagram for the transmission of the uplink RLC blocks wherein the timer value is indicated on a dedicated channel.

FIG. 3 illustrates a flow diagram of an example of the steps for transmitting a RLC block from a mobile station to the network, 300. In this embodiment according to the present invention the timer value is sent to the MS in a dedicated signaling message. First MS requests an uplink TBF with Packet Channel Request (and Packet Resource Request) messages, 302. The network determines the timer values, 304, allocates resources and informs the mobile on the allocated resources in Packet Uplink Assignment messages, 306. In case the timer based TBF release according to the invention is used, Packet Uplink Assignment message contains the timer value Tx. The network determines the value of Tx based on parameters which are received from the mobile station and/or the network. Such parameters are preferably priority, throughput and traffic class. The mobile station may also inform the network the timer value it suggests to use. The network may alternatively determine the timer value independently based on the information it has on the MS, network load etc.

In the next phase the mobile station transfers the uplink data, 308. Always when the buffer becomes empty, 310, the mobile station starts the timer with expiring time set to Tx, and the network starts another timer with value Ty, 312. Ty may depend on the value Tx.

During the timeTy the network will regularly allocate transmission permission to the mobile station by polling in order to find out whether the mobile station has data to transmit. In case the mobile station transmits data, 330, the network resets its timer and continues normal data transfer, 308. When the MS gets a sending permission and has something to send it stops the timer and continues the data transfer normally. If one of the timers Tx or Ty expires the TBF is released, 322. If mobile station has no data to send when it gets a sending permission it may send e.g. a packet uplink dummy control block. In this case neither of the timers is reset.

In the procedure of FIG. 3 the timer value was informed to the mobile station with a Packet Downlink Assignment message. The following table shows an example of information elements in a Packet Downlink Assignment message with added TBF timer value:

```
< Packet Downlink Assignment message content > ::=
    < PAGE_MODE : bit (2) >
    { 0|1 <PERSISTENCE_LEVEL : bit (4) > * 4 }
    { { 0 < Global TFI : < Global TFI IE > >
    |10 < TLLI : bit (32) > }
    { 0           -- Message escape
    {   < MAC_MODE : bit (2) >
        < RLC_MODE : bit (1) >
        < CONTROL_ACK : bit (1) >
        < TIMESLOT_ALLOCATION : bit (8) >
        < Packet Timing Advance : < Packet Timing Advance IE > >
        { 0|1 < P0 : bit (4) >
                < BTS_PWR_CTRL_MODE : bit (1) >
                < PR_MODE : bit (1) > }
        { { 0|1 < Frequency Parameters : < Frequency Parameters IE > > }
        { 0|1 < DOWNLINK_TFI_ASSIGNMENT : bit (5) > }
        { 0|1 < Power Control Parameters : < Power Control Parameters IE >> }
        { 0|1 < TBF Starting Time : < Starting Frame Number Description IE > > }
        { 0|1 < Measurement Mapping : < Measurement Mapping struct > > }
        { null|0 bit** = <no string>
                { 0|1 <Timer TBF Release value > }
                { 0|1 < EGPRS Window Size : < EGPRS Window Size IE >>
        < LINK_QUALITY_MEASUREMENT_MODE : bit (2) >}
                { 0|1 <Packet Extended Timing Advance : bit (2)> }
                < TIMESLOT_QUAL_REP : bit (1) > }
                { 0|1 < BEP_PERIOD2 : bit(4) > } }
                { 0|1 < COMPACT reduced MA : < COMPACT reduced MA IE >> }
                < padding bits > } }
        ! < Non-distribution part error : bit (*) = < no string > > }
        ! < Message escape : 1 bit (*) = <no string> > }
    ! < Address information part error : bit (*) = < no string > > }
    ! < Distribution part error : bit (*) = < no string > > ;
```

The timer value is thus informed in the message field { 0|1<Timer TBF Release value> }. The meaning of the other above message fields is described in document [1].

The timer value can be transferred, except on starting the resource allocation for the data transfer, also during data transfer or during a passive period.

If the timer value is presented in a message with two bits the following examplary representation could be used:

| Message Field Value | Timer value |
|---|---|
| 00 | 1s |
| 01 | 5s |
| 10 | 20s |
| 11 | 60s |

The timer value could also be presented with a multiplier that refers to certain reference value, for example 500 ms. In the message only the multiplier value would be transmitted. For example, if the reference value would be 500 ms, the four alternative values of a two bit message field would correspond to the timer values 0 ms, 500 ms, 1000 ms and 1500 ms. The reference value can be defined in system specifications or it may be transmitted through the system information messages or control messages.

Figure 4:
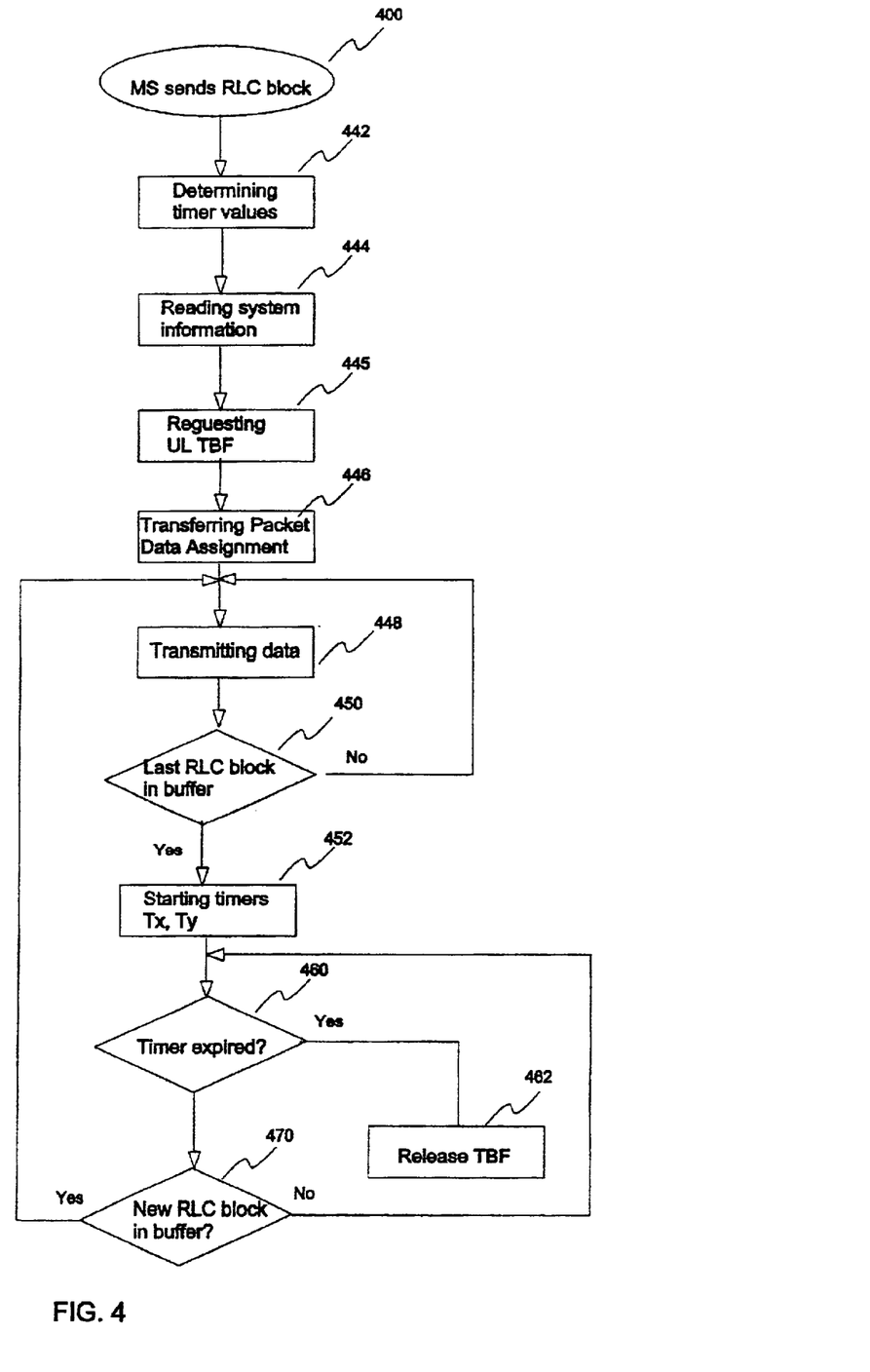
FIG. 4 illustrates a flow diagram for the transmission of the uplink RLC blocks wherein the timer value is indicated on a common channel.

FIG. 4 illustrates a flow diagram of another example of the steps for transmitting a RLC block from a mobile station to the network, 400. In this embodiment according to the present invention the timer value is sent to the mobile station in the system information procedure. The network first determines the timer values, 442, and the mobile station reads system information messages and in case it supports timer based release method it stores the received timer values Tx1, Tx2, . . . , 444. If there are several timer values for different data types, all or part of the timer values are stored. When the mobile station requests an uplink TBF, 445, the network allocates resources and notifies the mobile station with Assignment messages, 446. The uplink TBF continues, 448–470 as described above in FIG. 3, 308–330, except that network does not inform the mobile station the used timer values in the Assignment messages. MS and network will use the value that has been assigned to the parameters values of the TBF that is to be setup.

In an uplink resource allocation of FIGS. 3 and 4, a mobile station indicates to the network that it requires radio resources for delay sensitive data transfer. The network needs the information in order to assign sufficient radio resources for the mobile station to provide the required service level. The information may be provided to the network via one of the following ways, where some system-specific message denominations are used as examples with no intention to limit the applicability of the invention:

The mobile station sends a PACKET CHANNEL REQUEST message to the network, and the message has a specific type for delay sensitive data transfer;
  CHANNEL REQUEST DESCRIPTION information element or other corresponding information element is included into a PACKET RESOURCE REQUEST message and the information element includes information indicating that delay sensitive data is to be transferred or;
  A priority field or other field is included in the radio resource request message, such as a PACKET CHANNEL REQUEST or a PACKET RESOURCE REQUEST message, that is transmitted by the mobile station to the network and the field identifies unambiguously that delay sensitive data is to be transferred.

In addition to the information on that radio resources that are required for the delay sensitive data transfer, the radio request information may also include the following additional parameters that specify more accurately the required resources;

The number of required packet data channels;

The information on whether the communication is unidirectional or bidirectional. This makes the network able to determine whether the mobile station requires also downlink resources. By reserving downlink resources simultaneously with the uplink radio resources it is possible to avoid a situation where the mobile station would receive downlink data but the network is unable to reserve downlink radio resources at that moment;

The information on desired timer values Tx, Ty.

As the length of the PACKET CHANNEL REQUEST message is only 11 or 8 bits, it may be difficult to include the above parameters into the message. Therefore it may be preferable to use two phase access when requesting radio resources for delay sensitive data transfer, if a more accurate description of the requested radio resources is necessary.

Although the above embodiments concerned uplink TBF transmission a corresponding timer function can also be used in downlink data transfer. In a downlink resource allocation, the procedure starts when the network needs to transmit data to the mobile station that has no downlink radio resources assigned or when the mobile station requests the establishment of a downlink TBF during an uplink TBF establishment procedure. The network allocates sufficient radio resources based on the information that is attached to the packet data. The information includes an indication that radio resources are required for delay sensitive data transfer so that the network can assign sufficient radio resources in order to provide the required service level. For example, the delay sensitivity of the data may be indicated in a information element included into the quality of service (QoS) profile. Delay sensitivity of the data transfer may also be indicated in a new field in the QoS profile or in a new information element that is attached to the data sent from the network, eg. from a SGSN, to the BSS.

In addition the following parameters may be included into the information that is received from the SGSN in order to describe the required radio resources more accurately:

Information on the timer parameters and timer values.

The number of required packet data channels;

The information on whether the communication is unidirectional or bidirectional. This makes the network able to determine whether the mobile station requires also uplink radio resources. By reserving downlink resources simultaneously with the uplink radio resources it is possible to avoid a situation where the mobile station would need to send uplink data but the network is unable to reserve uplink radio resources at that moment.

Figure 5:
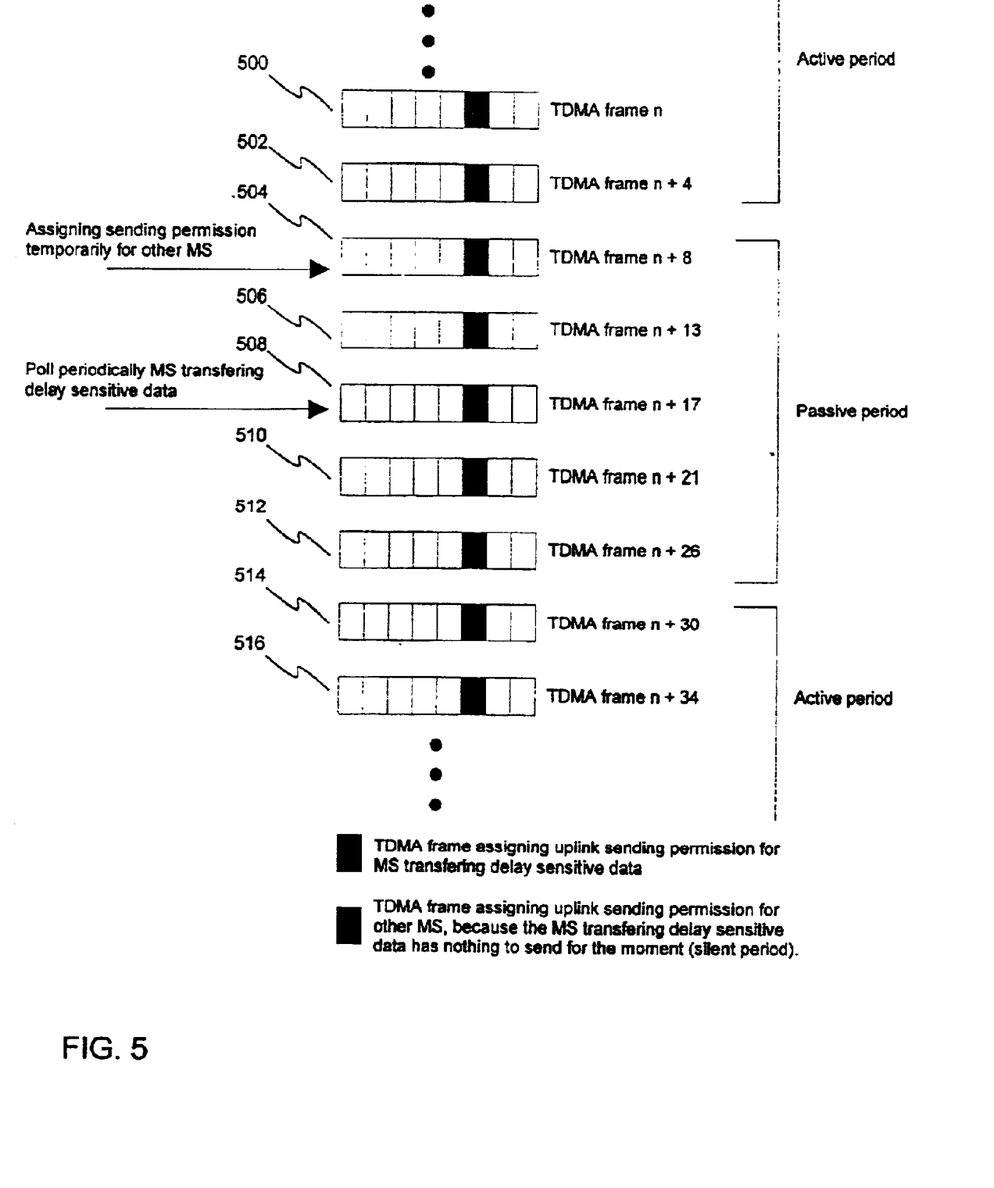
FIG. 5 illustrates TDMA frames of active and passive periods of a delay sensitive data flow and FIG. 6 illustrates a block diagram of a mobile station according to the invention.

FIG. 5 shows successive TDMA frames, in which time slot 5 is used for a packet data channel. In the TDMA frames 500 and 502, the packet data channel is allocated for an active connection of delay sensitive data transfer. As the active period changes into a passive (silent) period, the network assigns a transmit permission to a second connection in frame 504. During the passive period, frames 504–512, the network also periodically assigns sending permissions to the mobile station of the first connection for a channel request, frame 508. As the active period starts again, frames 514, 516, the permission for an uplink data transfer may be given back to the first connection. If the second connection is transferring delay sensitive data as well, then one of the connections may be reallocated to another packet data channel at the beginning or at the end of the passive period.

When the same packet data channel is allocated for several passive connections all the other delay sensitive users can be reallocated to other packet data channels when one of them starts transmitting. Alternatively they may wait for an uplink transmission permit on the same packet data channel. In practice the reallocation may be carried out by sending a signalling message, such as a PACKET UPLINK ASSIGNMENT, containing new packet data channel allocation to each mobile station being reallocated. Another alternative is to send a single signalling message, such as a PACKET REALLOCATION, containing new packet data channel allocations to all/some mobile stations being reallocated. Using only one signalling message leaves more free radio capacity for other purposes.

When the network receives delay sensitive data for a mobile station, the network reserves as much downlink packet data channel capacity to the mobile station as is needed. This naturally requires that the network has the needed resources available. This may mean that the packet data channel is dedicated temporarily for a single mobile station in the downlink direction. During the passive periods in downlink delay sensitive data transfer the network may assign downlink transmission permissions to other mobile stations and thus the network can transmit data to other mobile stations. In order to prevent a situation where the network receives delay sensitive data to more than one mobile station simultaneously on the same packet channel/channels and thus would have to block all but one, the network may distribute the other mobile stations using delay sensitive data transfer to other packet data channels. The distribution can be made using the following mechanisms:

Early downlink assignment: When the network receives delay sensitive data for a mobile station, it reallocates the other delay sensitive data users residing on the same packet data channel. Delay insensitive data users may be reallocated to other packet data channels or alternatively they will wait for a transmission permit on the same packet data channel. The network transmits a signalling message, such as a PACKET DOWNLINK ASSIGNMENT, containing new packet data channel allocations to all/some mobile stations being reallocated.

Late downlink assignment: When the network receives delay sensitive data for a mobile station, it does not immediately reallocate the other mobile-stations residing on the same packet data channel. Only when the network receives delay sensitive data for a mobile station and the network is already transferring delay sensitive data to some other mobile station on the same packet data channel, the network assigns a new packet data channel to the mobile station. The new packet data channel is assigned, e.g. by sending a PACKET DOWNLINK ASSIGNMENT signalling message to the mobile station.

The network should control that the delay sensitive data does not need to queue too long for a downlink transmission permit. The network should also control that the signalling messages related to the other temporary block flows of other mobile stations do not excessively occupy the packet data channel. This may be accomplished by giving the same or a higher priority to the delay sensitive data transfer compared to signalling messages of other temporary block flows.

When the network has temporarily no delay sensitive data to be transmitted, it preserves the temporary block flow and does not set the FBI field to value "1" after transmitting the the last buffered RLC data block. The mobile station controls the termination of the downlink TBF with a timer or the network may contain a logical entity including a timer function that is able to determine, when the TBF is to be released.

Figure 6:
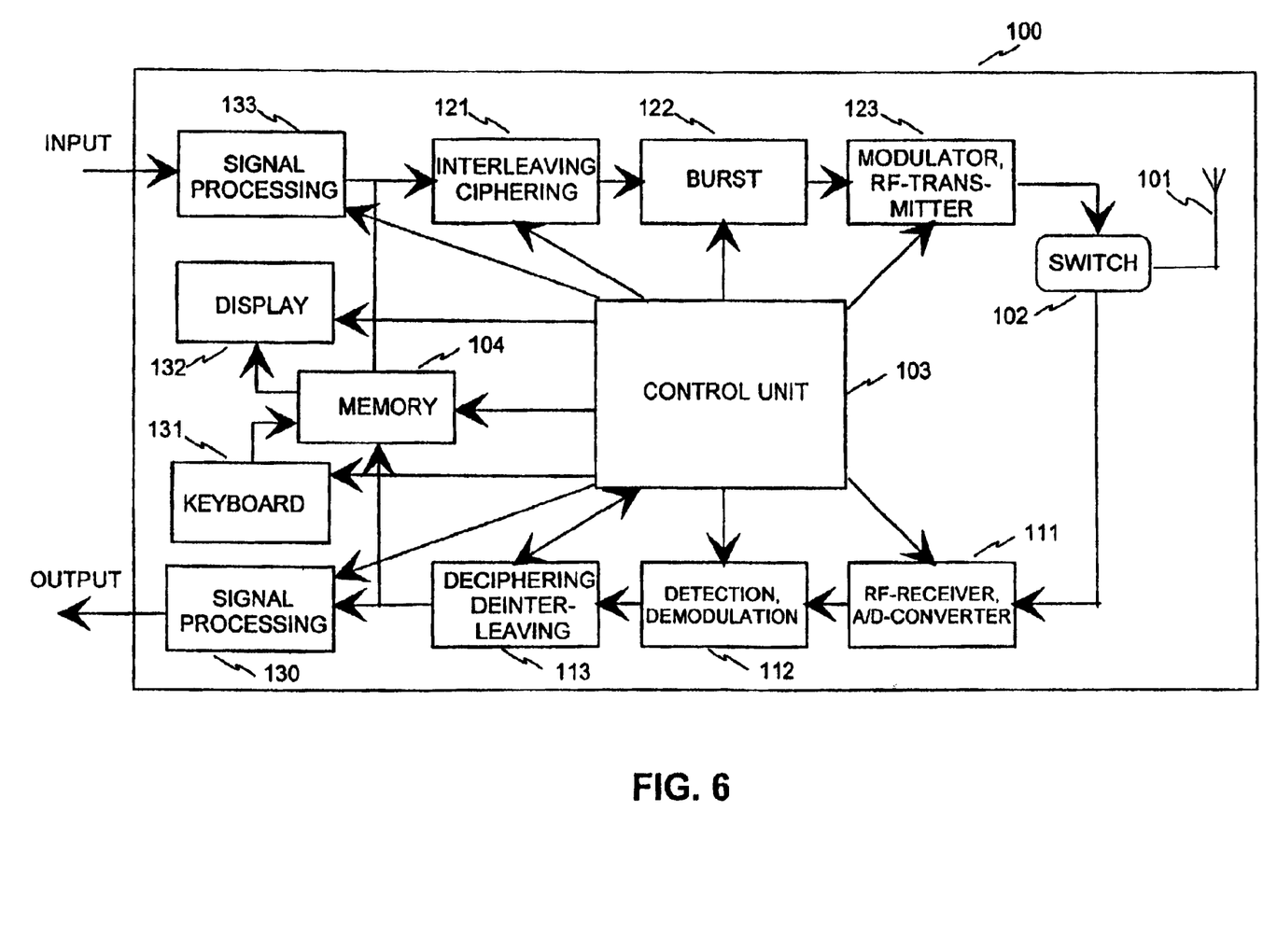

FIG. 10 shows a block diagram of a mobile station 100 according to the invention. The mobile station comprises an antenna 101 for receiving radio frequency signals from base stations. The received RF signal is led with the switch 102 to the RF receiver 111, in which the RF signal is amplified and converted digital. Thereafter the signal is detected and demodulated in block 112. The type of the demodulator depends on the system radio interface. It may include a QAM demodulator, or a RAKE combiner. The deciphering and deinterleaving is made in block 113. After this, the signal is processed according to the signal type (speech/data). The received packet data can be converted acoustic with a loudspeaker, or the received packet data can be linked to a separate device, such as a video monitor. A control unit 103 controls the receiver blocks according to a program that is stored into a memory 104. Especially the control unit controls the receiving blocks in such a way that the timer parameters according to the present invention are received.

In the transmission of a signal, the control unit controls the signal processing block 133 according to the type of signal. Block 121 further makes the ciphering and interleaving for the signal. In aTDMA transmitter bursts are formed from the coded data in block 122. The bursts are further modulated and amplified in block 123. The RF signal is led to the antenna 101 via the switch 102 for transmission. The processing and transmission blocks are also controlled by the control unit. Especially the control unit includes the timer function(s) and controls the transmission of blocks in such a way TBFs are maintained/released according to the present invention. Also the channel selection is controlled by the control unit in such a way that the assigned packet data channel is used.

In general, the processing of information in a telecommunication device takes place in an arrangement of processing capacity in the form of microprocessor(s) and memory in the form of memory circuits. Such arrangements are known as such from the technology of mobile stations and fixed network elements. To convert a known telecommunication device into a telecommunication device according to the invention it is necessary to store into the memory means a set of machine-readable instructions that instruct the microprocessor(s) to perform the operations described above. Composing and storing into memory of such instructions involves known technology which, when combined with the teachings of this patent application, is within the capabilities of a person skilled in the art. On the network side, the features according to the invention can be implemented e.g. in the Packet Control Unit PCU that assigns e.g. uplink and downlink sending permissions for mobile stations. The packet control unit may be located e.g. in the Base Tranceiver Station BTS, Base Station Controller BSC or Serving GPRS Support Node SGSN.

Above, an examplary embodiment of the solution according to the invention has been described. The principle according to the invention can naturally be modified within the frame of the scope defined by the claims, for example, by modification of the details of the implementation and ranges of use. The invention is therefore not restricted to GPRS, but the inventive idea can be applied as well to other communication systems with packet data transfer.

The information on the timer value can be transferred on the above mentioned channels and messages, or it may as well be transferred in a signalling message on some other control channel such as SACCH (Slow Associated Control CHannel) of the GSM system; also many other signalling possibilities exist for transferring the corresponding information. Especially the use of the SACCH or a comparable control channel will enable the transmission of such information at any time, irrespective of whether there is currently an active period or not. Also transferred the timer parameters of the message field were given as examples; many other ways of transferring the information can e applied.

The invention is not in any way restricted to transferring speech data, but it can be applied in a packet radio service where any data flows with passive and active periods are transferred. One example is TCP based applications e.g. IMAP or SMTP based e-mail downloading where during the session many short packets are sent due to session setup and control purposes.

Cited Documents

[1] Digital cellular telecommunications system (Phase 2+); General Packet Radio Service (GPRS); Mobile Station (MS)—Base Station System (BSS) interface; Radio Link Control/Medium Access Control (RLC/MAC) protocol (GSM 04.60 version 6.1.0); European Telecommunications Standards Institute;

[2] Finnish patent application FI 982577 which corresponds to U.S. patent application Ser. No. 09/447988 and European patent application 99308864.0.

What is claimed is:

1. A method for transferring a data flow by creating a connection on a packet radio service of a telecommunication system, said connection constituting a packet data channel, wherein the data flow comprises at least one active data transfer period, and after an active data transfer period the connection is maintained for a predetermined time period, whereafter the connection is released unless a new active period starts before the predetermined time period has lapsed, characterized in that a length of said predetermined time period is determined by the telecommunication system, and information on said determined length is transferred from the telecommunication system to a mobile station.

2. A method according to claim 1, characterized in that said information is transferred on a dedicated signaling channel.

3. A method according to claim 2, characterized in that said information is transferred en a Packet Data Assignment message.

4. A method according to claim 1, characterized in that said information is transferred on a broadcast channel.

5. A method according to claim 4, characterized in that said information is transferred on a system information message.

6. A method according to claim 1, characterized in that the radio service is GPRS.

7. A method according to claim 1, characterized in that when a passive data transfer period follows an active data transfer period, the network allocates a number of transmit permissions that can be allocated to other temporary block flows on the packet data channel.

8. A method according to claim 1, characterized in that when the same packet data channel is allocated for more than one connection of delay sensitive data, all such connections having a passive period, and when a first connection changes to an active transfer period, a second connection is reallocated to another packet data channel.

9. A method according to claim 1, characterized in that when releasing a temporary block flow in a first direction (uplink/downlink) of packet data transfer, a temporary block flow in the opposite data transfer direction is maintained at least for a predetermined time.

10. A method according to claim 1, characterized in that the network is informed on whether the packet data to be transferred is delay sensitive.

11. A method according to claim 1, characterized in that the length of said time period is determined on the basis of the required quality of service value of the connection.

12. A method according to claim 1, characterized in that the length of said time period is determined on the basis of the communication type of the connection.

13. A method according to claim 1, characterized in that the length of said time period is determined on the basis of a momentary communication activity in the network or cell.

14. A method according to claim 1, characterized in that the information on the determined length is transferred as a parameter, wherein the parameter has one of a determined number of alternative values, and each alternative parameter value corresponds to a determined value of the length of the time period.

15. A method according to claim 14, characterized in that the length of the time period equals to a parameter value multiplied with a predetermined reference time value.

16. A method according to claim 15, characterized in that said reference time value is given to the mobile station in one of the following ways:

the reference time value is broadcasted in a system information message;

the reference time value is broadcasted in signaling messages; or the timer value is a constant defined in system specifications.

17. A method according to claim 1, characterized in that the information on the length of the time period is transferred during a resource allocation for the data transfer.

18. A method according to claim 1, characterized in that the information on the length of the time period is transferred during the data transfer.

19. A method according to claim 1, characterized in that the said information on the length of the time period is transferred during a passive period.

20. A method according to claim 1, characterized in that the mobile station sends an initial value for the time period and a network determines the length for the time period on a basis of said initial value.

21. A method according to claim 1, characterized in that the value for the time period is related with uplink data transfer.

22. A method according to claim 1, characterized in that the value for the time period is related with downlink data transfer.

23. A telecommunications system for transferring a data flow by creating a connection on a packet radio service, wherein the data flow comprises at least one active data transfer period, and the telecommunication system comprises means for maintaining the connection for a predetermined time after an active data transfer period and means for releasing the connection after the predetermined time period has passed unless a new active period has started, characterized in that the telecommunication system further comprises means for determining a length of said predetermined time period, and means for transferring information on said determined length from the telecommunication system to a mobile station.

24. A mobile station for transferring a data flow by creating a connection on a packet radio service to a cellular telecommunications system, wherein the data flow comprises at least one active data transfer period, and the mobile station comprises means for maintaining the connection for a predetermined time after an active data transfer period and means for releasing the connection after the predetermined time period has passed unless a new active period has started, characterized in that the mobile station further comprises means for receiving information on length of said predetermined time period from the telecommunication system.

* * * * *